(12) United States Patent
Lamine et al.

(10) Patent No.: US 8,289,609 B2
(45) Date of Patent: Oct. 16, 2012

(54) CONTROLLED-TRANSPARENCY ELECTROCHROMIC DEVICE

(75) Inventors: Driss Lamine, Paris (FR); Emmanuel Valentin, Le Plessis Trevise (FR); Samuel Dubrenat, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 160 days.

(21) Appl. No.: 12/922,351

(22) PCT Filed: Apr. 15, 2010

(86) PCT No.: PCT/FR2010/050724
§ 371 (c)(1),
(2), (4) Date: Oct. 15, 2010

(87) PCT Pub. No.: WO2010/119229
PCT Pub. Date: Oct. 21, 2010

(65) Prior Publication Data
US 2011/0043885 A1    Feb. 24, 2011

(30) Foreign Application Priority Data

Apr. 16, 2009   (FR) ..................................... 09 52492

(51) Int. Cl.
*G02F 1/153*   (2006.01)
(52) U.S. Cl. ..................................................... 359/266
(58) Field of Classification Search ........... 359/265–275
See application file for complete search history.

(56) References Cited

U.S. PATENT DOCUMENTS 5,724,175 A * 3/1998 Hichwa et al. ................ 359/265
6,337,758 B1   1/2002 Beteille et al.

| | | |
|---|---|---|
| 2004/0053125 A1 | 3/2004 | Giron et al. |
| 2008/0030836 A1 | 2/2008 | Tonar et al. |
| 2009/0284821 A1 | 11/2009 | Valentin et al. |

FOREIGN PATENT DOCUMENTS

| | | |
|---|---|---|
| FR | 2 781 084 | 1/2000 |
| FR | 2 874 100 | 2/2006 |
| WO | WO 02/06889 A1 | 1/2002 |
| WO | WO 2004/042457 A2 | 5/2004 |

OTHER PUBLICATIONS

U.S. Appl. No. 12/922,341, filed Sep. 13, 2010, Lamine, et al.
U.S. Appl. No. 12/920,756, filed Nov. 9, 2010, Valentin, et al.
International Search Report issued Jul. 28, 2010, in Patent Application No. PCT/FR2010/050724.

* cited by examiner

*Primary Examiner* — Joseph P Martinez
(74) *Attorney, Agent, or Firm* — Oblon, Spivak, McClelland, Maier & Neustadt, L.L.P.

(57) ABSTRACT

The present invention relates to an electrochromic device comprising:
- at least one partition (12) that separates the surface of the upper electrode (9) into two regions isolated from each other, namely a free region (9a) and an active region;
- at least one partition (5) that separates the surface of the lower electrode (4) into two regions electrically isolated from each other, namely a free region (4a) and an active region (4b);
- at least one free region (9a) of the upper electrode (9) receives a first current-supply connector (15) soldered to the active zone (4b) of the lower electrode (4); and
- the active area (9b) of the upper electrode (9) is in electrical contact with the connection means (20, 21a) connected to a second current-supply connector (21) electrically isolated from the free zone (9a) connected to the lower electrode (4).

22 Claims, 9 Drawing Sheets

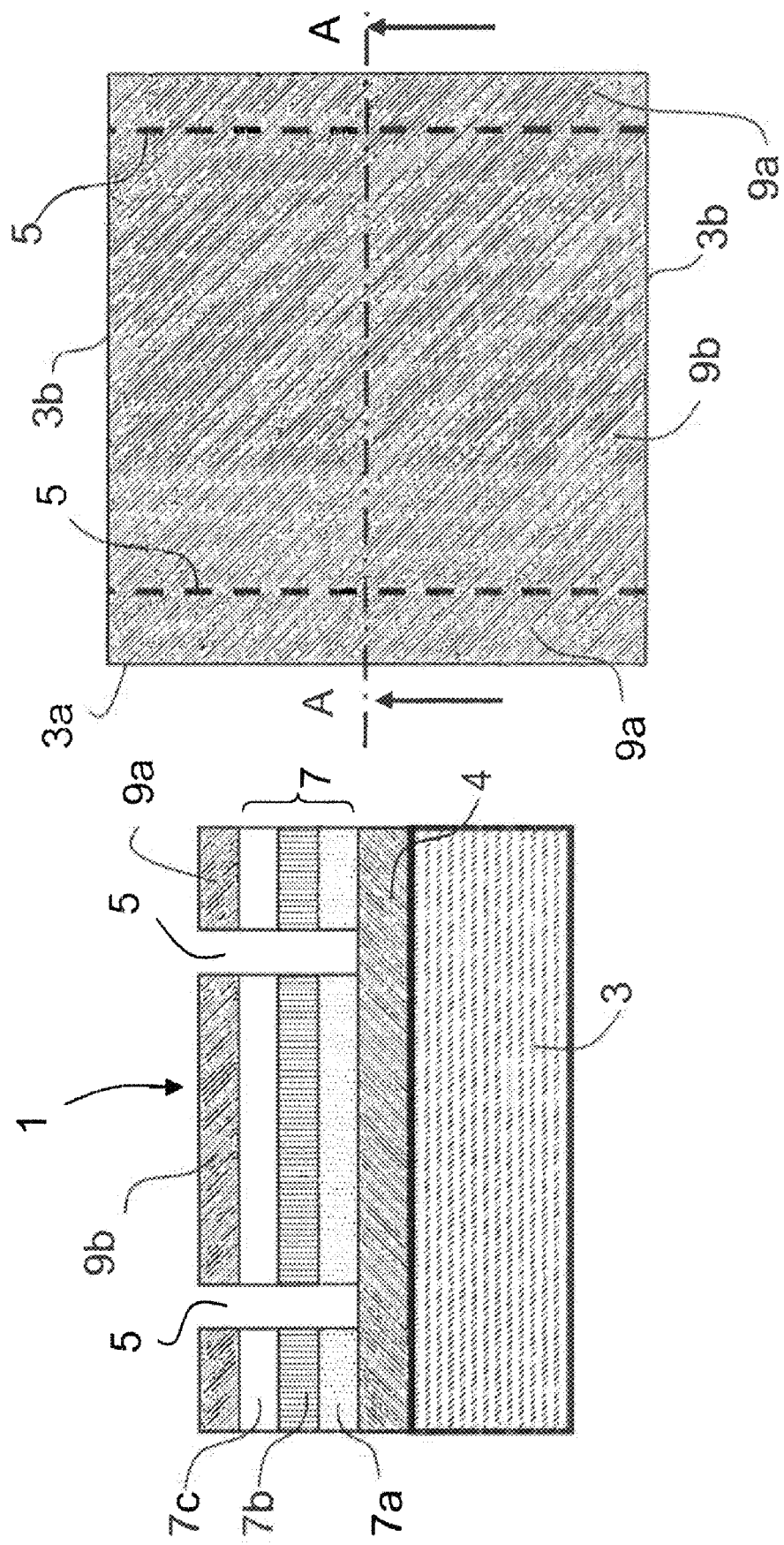

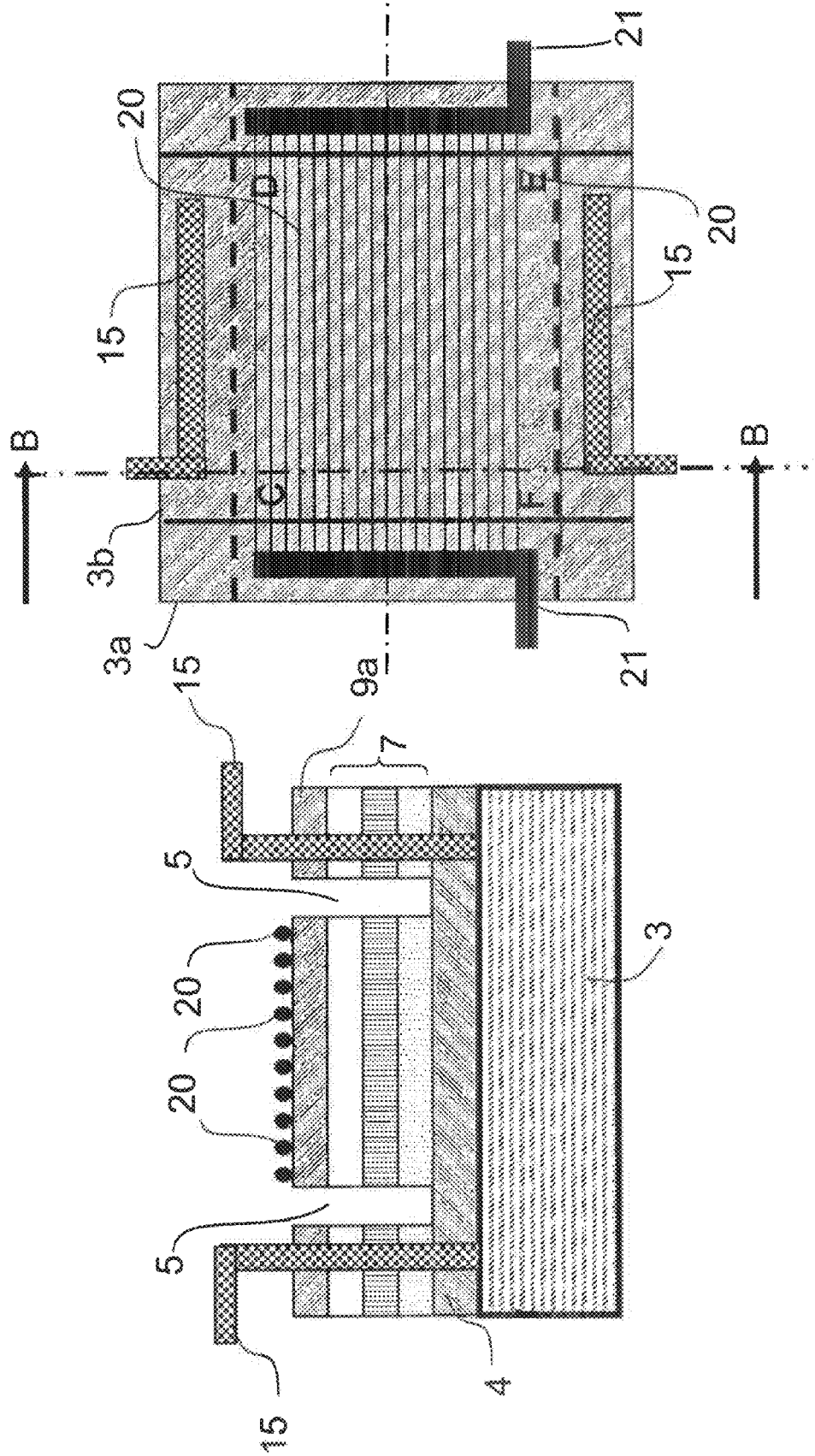

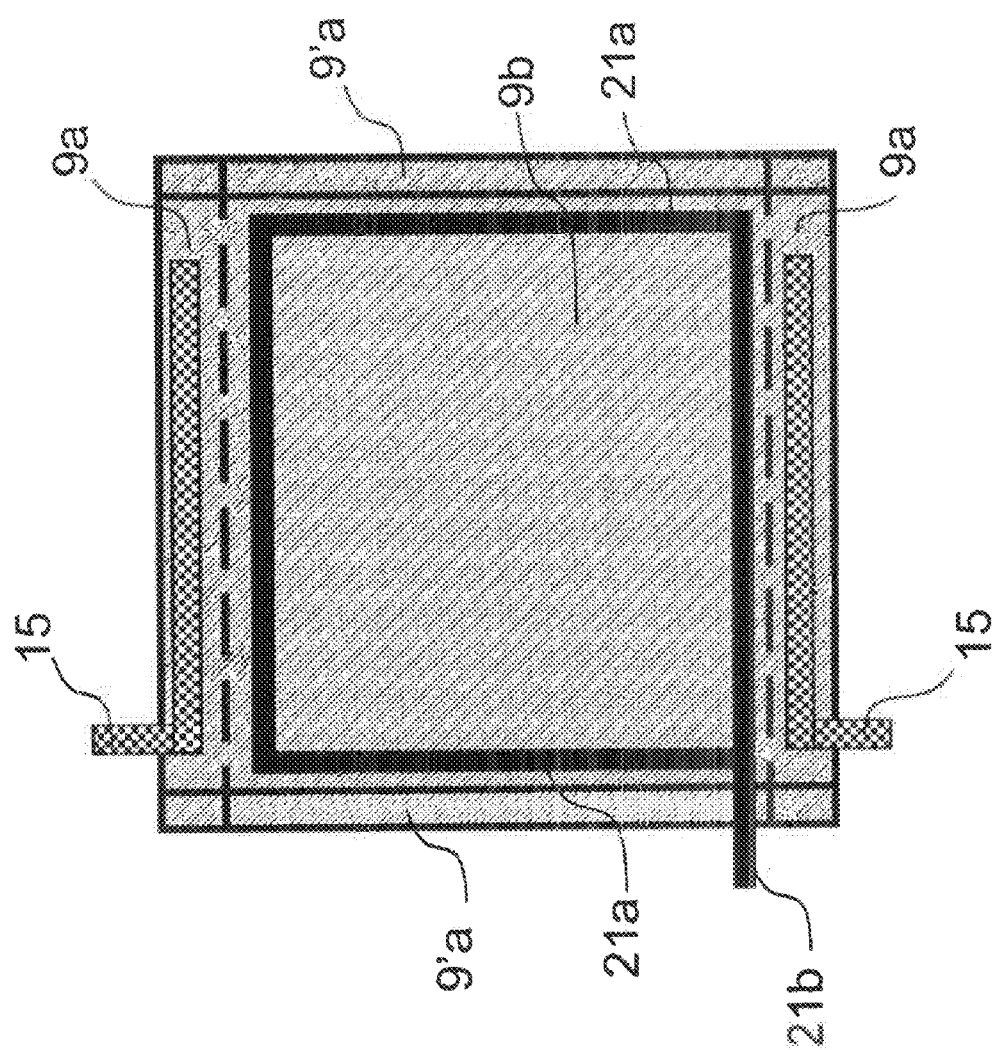

CONTROLLED-TRANSPARENCY ELECTROCHROMIC DEVICE

The present application is the U.S. national stage of international application PCT/FR2010/050724, filed on Apr. 15, 2010, the text of which is incorporated by reference, and claiming the benefit of the filing date of French application number 0952492, filed on Apr. 16, 2009, the text of which is incorporated by reference.

The present invention relates to a controlled-transparency electrochromic device, in particular a device designed for use in electrically controllable glazing and to a process for fabricating said device. The invention also relates to electrochromic glazing provided which such a device and to the use of this glazing in the widest variety of applications.

Glazing with a light transmission capacity that may be adjusted from a good transparency level to the greatest opacity is known. Such glazing has been applied to the widest variety of technical fields.

The glazing may thus be used as windows for a dwelling so as for example to regulate the amount of sunlight entering a room depending on the conditions outside and the desires of the users. The glazing may also be used for partition screens to preserve the privacy of the occupants of a room either with respect to the outside or with respect to adjoining rooms.

Such devices may also be used in the automotive field, for example, to adjust the transparency of the windshield and/or of the side windows or of the sunroof of an automobile, as well as the transparency of some of the accessories of said automobile, such as, in particular, the rearview or wing mirrors, so as to control the flux of light reflected toward the driver and to avoid dazzling the latter. Of course they may also be used in other fields such as, in particular, the aeronautical field to control for example the transparency of aircraft cabin windows.

It is known that electrochromic devices comprise a layer of an electrochromic material capable of inserting, reversibly and simultaneously, ions and electrons, the oxidation states of which, corresponding to the inserted and ejected states, have a distinct color when they are supplied via a suitable power supply, one of these states having a higher light transmission than the other. The electrochromic material may be, for example, based on tungsten oxide and must be brought into contact with an electron source, such as for example a transparent electrically conductive layer, and with an ion (cation and anion) source such as an ionically conductive electrolyte. It is known that a counter-electrode, also capable of reversibly inserting cations, must be associated with the layer of electrochromic material, symmetrically with respect to said layer, so that, macroscopically, the electrolyte appears as a single ion medium. The counter-electrode must be constituted of a layer which is neutral in color or, at least, transparent or barely colored when the electrochromic layer is in the colored state.

Since tungsten oxide is a cathodic electrochromic material, i.e. its colored state corresponds to the most reduced state, an anodic electrochromic material based on nickel oxide or iridium oxide may be, for example, used for the counter-electrode. It has also been proposed to use a material which is optically neutral in the oxidation states in question, such as, for example, cerium oxide or organic materials such as electronically conductive polymers (polyaniline) or Prussian blue.

At the present time, electrochromic systems may be put into two categories depending on the electrolyte used.

In the first category, the electrolyte may thus take the form of a polymer or a gel, such as for example a proton-conductive polymer, such as those described in European patents EP 0 253 713 and EP 0 670 346, or a polymer conducting by lithium ions, such as those described in the patents EP 0 382 623, EP 0 518 754 and EP 0 532 408. These systems are then called "hybrid" electrochromic systems.

In the second category, the electrolyte may also be constituted of a mineral layer forming an ion conductor which is electrically isolated. Theses electrochromic systems are then referred to as "all solid-state" systems. The reader may refer to European patents EP 0 867 752 and EP 0 831 360.

Other types of electrochromic systems are known, such as in particular what are called "all polymer" electrochromic systems, in which two electrically conductive layers are placed on either side of a multilayer stack comprising a cathodic-coloration polymer, an ion-conductive electronically insulating polymer (most particularly for $H^+$ or $Li^+$ ions) and finally an anodic-coloration polymer (such as polyaniline or polypyrrole).

It is known that the current electrochromic device fabrication technique consists, schematically, in successively depositing onto a support substrate, whether transparent or not, a lower electrically conductive layer, generally a layer of indium tin oxide (ITO), functional electrochromic layers, for example iridium oxide (IrOx), tungsten oxide ($WO_3$), tantalum oxide ($Ta_2O_5$), and an upper electrically conductive electrode. Usually, the multilayer stack is completed by a lamination polymer and a counter-substrate.

Of course, the two upper and lower electrically conductive electrodes must be joined to respective current-supply connectors. This connection is usually by means of metal shims which are brought into contact with the upper electrode and with the lower electrode.

Although bringing the connector into contact with the upper electrode presents almost no difficulties in principle, this is not the case for the contact of the connector with the lower electrode because the latter is inaccessible due to the deposition of the various layers. This is why, a region of the latter denoted a "connection region" is maintained, by means of an adhesive mask, during the deposition of the electrochromic layers. Once the various layers are deposited the adhesive may be removed, lifting off, simultaneously, the layers deposited on it and thus allowing access to the lower electrode, the latter then receiving the connector which is intended for it.

This technique has a number of drawbacks linked, particularly, on the one hand, to the use of the adhesive mask and, on the other hand, to the means used to fix the connectors to the electrodes.

As regards the adhesive mask, its placement is a long and delicate operation, where, on the one hand, the adhesive mask must be applied onto the lower electrode perfectly so as not to disturb the deposition of the subsequent layers and, on the other hand, the length to be covered is significant, particularly when the connection with the lower electrode is made over the entire periphery of the substrate.

Next, during the removal of the mask, the layers which have been deposited thereon have a tendency to disintegrate and then to be redeposited on the multilayer stack in the form of particulates, thus causing the device to malfunction. This is why, so as to avoid such a drawback, the removal of the mask is usually accompanied by vacuum suction, which requires two operators to perform this operation.

Moreover, during the deposition of the various layers following the application of the adhesive mask, the latter sometimes shrinks under the effect of heat, as a result, during the application of the electrically conductive layer forming the upper electrode, the latter may come into contact with the lower electrode thus creating a more or less partial short-circuit having the effect of reducing the contrast that the device is able to deliver. To alleviate such risk a controlled margin is produced at the periphery of the region covered by the mask, which is to say a gap passing through the various deposited layers, stopping on the layer forming the lower electrode.

In addition, the selection of the adhesive mask is a delicate operation insofar as the latter must preserve its integrity despite the various physical stresses to which it is submitted during the deposition of the various layers. It must thus be able, in particular, to withstand significantly low pressures without outgassing, and have a good temperature resistance. As a consequence of such very strict specifications the cost of the adhesive mask is usually high.

One aim of the present invention is to remedy the aforementioned drawbacks by providing a controlled-transparency electrochromic device, in particular avoiding the problems inherent in the use of masking tapes.

One subject of the present invention is thus electrochromic device having controlled transmission or reflection of at least one electrically controllable active area, having, on a carrier substrate, a multilayer stack comprising at least, in succession, a layer forming a lower electrically conductive electrode, various functional layers at least one of which is an electrochromic layer, and a layer forming an upper electrically conductive electrode, in which device:

- at least one partition, denoted "selective", passes through the upper electrode and the various layers separating the upper electrode from the lower electrode without passing through the lower electrode, this selective partition dividing at least the surface of the upper electrode into two regions electrically isolated from each other, namely a free region and an active region containing the active area;
- at least one partition, denoted "total", passes through the upper electrode and the various layers separating the upper electrode from the substrate, this total partition dividing at least the surface of the lower electrode into two regions electrically isolated from each other, namely a free region and an active region containing the active area;
- at least one free region of the upper electrode receives a first current-supply connector soldered to the active region of the lower electrode; and
- the active area of the upper electrode is in contact with connection means connected to a second current-supply connector electrically isolated from the free region of the lower electrode.

According to the invention, the total partition will divide the surface of the upper electrode into two regions, namely a second free region and an active region containing the active area (CDEF), and the second current-supply connector will then be placed in the second free region of the upper electrode.

The connection means will possibly be made of an array of fine electrically conducting parallel wires or, for example, a metal frame, particularly a foil, placed on the periphery of the upper electrode.

Preferably the connection means will be supported by a transparent support, in particular made of a thermoplastic polymer such as, for example, polyurethane or polyvinyl butyral (PVB), which support may be a lamination interlayer.

In an implementation variant of the invention, the current-supply connector which is soldered to the lower electrode will possibly be placed onto several free regions of the upper electrode, and electrical isolation means will be provided between said second current-supply connector and the surface of the upper electrode, which isolation means may, in particular, be made from a thin electrically insulating sheet.

The carrier substrate may moreover be a substrate with a glazing function, particularly made of glass or plastic.

Preferably the solder joint between the current-supply connector and the lower electrode will be ultrasonically soldered. In addition, at least one of the electrodes will be formed from at least one mixed indium tin oxide (ITO).

The free regions defined by the total and selective partitions will preferably be located on the periphery of the substrate. Moreover, the latter will possibly be rectangular and the total and selective partitions will be respectively perpendicular and produced so as to be parallel with opposed sides of the substrate.

The subject of the present invention is also a process for fabricating an electrochromic device having controlled transmission or reflection of at least one electrically controllable active area, having, on a carrier substrate, a multilayer stack comprising of at least, in succession, an electrically conductive layer forming a lower electrode, various functional layers at least one of which is an electrochromic layer, and an electrically conductive layer forming an upper electrode, comprising the steps consisting in:

- depositing in succession, onto at least part of the surface of the substrate, the electrically conductive layer forming the lower electrode, the various functional layers and the electrically conductive layer forming the upper electrode;
- producing, starting from the upper electrode, at least one selective partition that passes through the latter as well as the other layers separating it from the lower electrode without passing through the lower electrode, each selective partition dividing at least the surface of the upper electrode into two regions electrically isolated from each other, namely a free region and an active region containing the active area (CDEF);
- producing, starting from the upper electrode, at least one total partition that passes through the latter as well as the layers separating it from the substrate, each total partition dividing at least the surface of the lower electrode into two regions electrically isolated from each other, namely a free region and an active region;
- soldering a current-supply connector to the free region of the upper electrode and to the active region of the lower electrode located in line with the latter; and
- placing connection means, which are electrically connected to a current-supply connector, in electrical contact with the active area of the upper electrode.

The solder joint will preferably be soldered ultrasonically. Moreover, at least one of the partitions will be produced by means of a laser beam.

In an advantageous variant of the process according to the invention, several electrochromic devices of the type described above are produced on one and the same substrate and, once said devices are completed, the carrier substrate and all the layers deposited thereon will be cut so as to constitute specific devices.

The subject of the present invention is also electrochromic glazing, characterized in that it includes an electrochromic device as previously described and in particular having a variable light and/or energy transmission and/or reflection, with the substrate or at least part of the substrates transparent or partially transparent, made of plastic, preferably mounted as multiple and/or laminated glazing or as double glazing.

The subject of the present invention is also the use of the previously described glazing as architectural glazing, as automotive glazing, as glazing for industrial vehicles or for public transport—by rail, sea or air—for agricultural vehicles, for construction site machinery, for rear-view or wing mirrors or for other mirrors, for displays and signage and for camera shutters.

Various embodiments of the present invention will be described hereafter, by way of nonlimiting example, and with reference to the appended drawings in which:

FIGS. 2a and 2b show, respectively, a schematic vertical sectional view along the line AA of FIG. 2b and a schematic top view illustrating a production phase of a selective partition according to the invention;

FIGS. 5a and 5b show, respectively, a schematic vertical sectional view along the line BB of FIG. 5b and a schematic top view illustrating a phase of contacting a connection element to the upper electrode of the device according to the invention shown in the preceding figures;

FIG. 8 is a top view of an implementation variant of the invention; and

Shown in FIGS. 1a to 5c are the essential phases of a first example of a process for fabricating a controlled-transmission electrochromic device 1 according to the invention which, in particular, is intended to applied in the construction of glazing the transparency of which it is desired to be able to adjust.

Figure 1B:
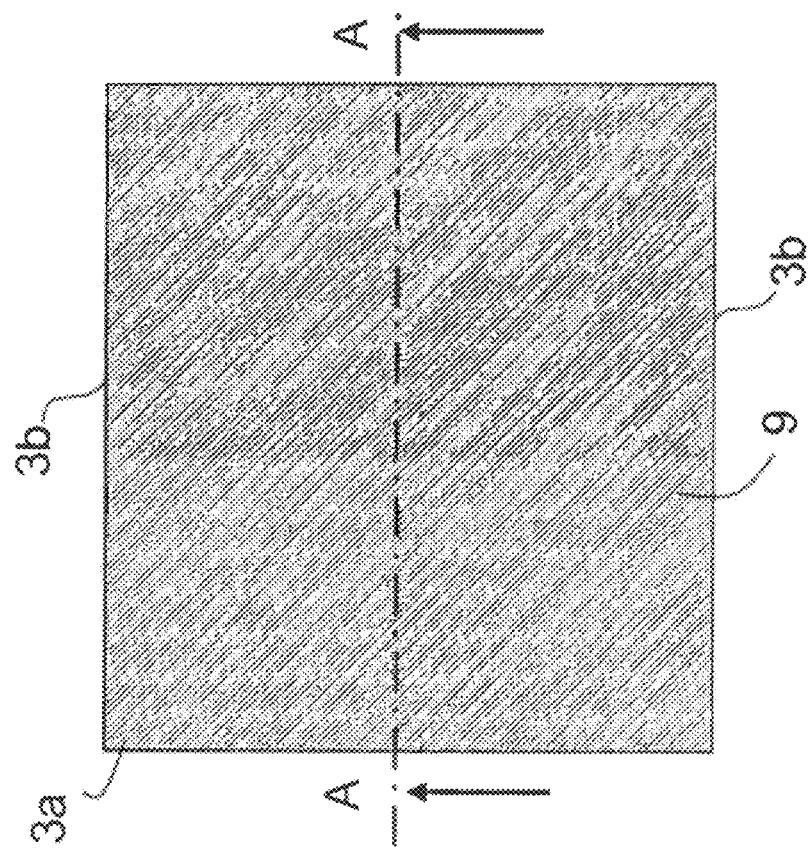
FIGS. 1a and 1b show, respectively, a schematic vertical sectional view along the line AA of FIG. 1b and a schematic top view of a first phase of a first embodiment of an electrochromic device according to the invention.
Figure 1A:
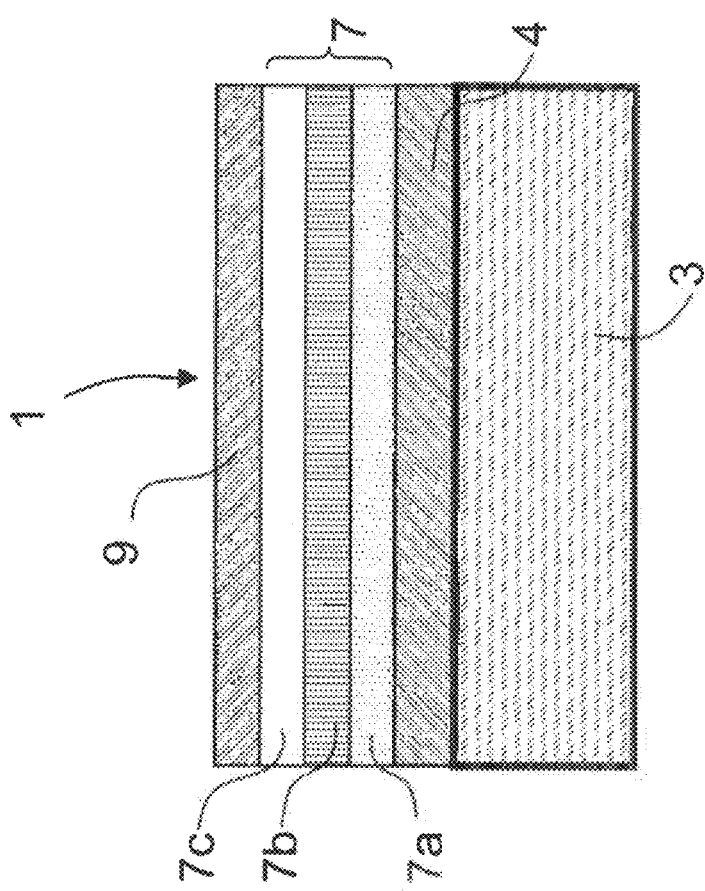

In a first step of the process according to the invention, and as shown in FIGS. 1a and 1b, an electrically conductive layer intended to form a lower electrode 4 is deposited on a carrier substrate 3 constituted, in the present mode of implementation, of a glass support. This deposition is, in particular, carried out by a conventional sputtering process. In a known manner this electrode may be of a metal type, or of a transparent conductive oxide (TCO) type made of $In_2O_3$:Sn (ITO), $SnO_2$:F or ZnO:Al. It may also possibly be a multilayer of the TCO/metal/TCO type, this metal being chosen, in particular, from silver, gold, platinum and copper, or a multilayer of the NiCr/metal/NiCr type, the metal being chosen, in particular, from silver, gold, platinum and copper.

Next, a series of layers 7 forming the functional electrochromic assembly, namely a first electrically active layer 7a followed by an electrolyte layer 7b and by a second electrically active layer 7c, are deposited. Finally, a second electrically conducting layer, forming the upper electrode 9, is deposited.

In a second step of the process, shown in FIGS. 2a and 2b, a straight partition 5 is produced as a border of two opposed sides 3a of the glass substrate 3, each parallel to said sides.

The term "partition" should be understood in the present text to mean a transection made through certain layers of the device, the width of which is sufficient for each part of a transected layer to be electrically isolated from the other part. The partition will be said to be "total" when it extends depthwise from the upper electrode 9 passing through the latter as well as all the layers separating it from the substrate 3. The partition will be said to be selective when it extends from the upper electrode 9 passing through the latter as well as all the layers separating it from the lower electrode 4 without passing through the latter.

These partitions will be preferably produced, in a known manner, by means of a laser beam, but any other means for producing them, as described above, may also be used.

Shown (as dotted lines) in FIGS. 2a and 2b are selective partitions 5, i.e. partitions that pass through the upper electrode 9 and all the layers separating the upper electrode from the lower electrode 4 without passing through the latter. Each of the two selective partitions 5 thus divides the surface of the upper electrode 9 into two regions, namely a first region 9a denoted "free" and a second region 9b denoted "active". In the present mode of implementation, the active region is common to both partitions and it contains the region that will be the active area CDEF of the device, which is to say the area wherein the transmission of light will be controlled as explained below.

Figures 3A, 3B:
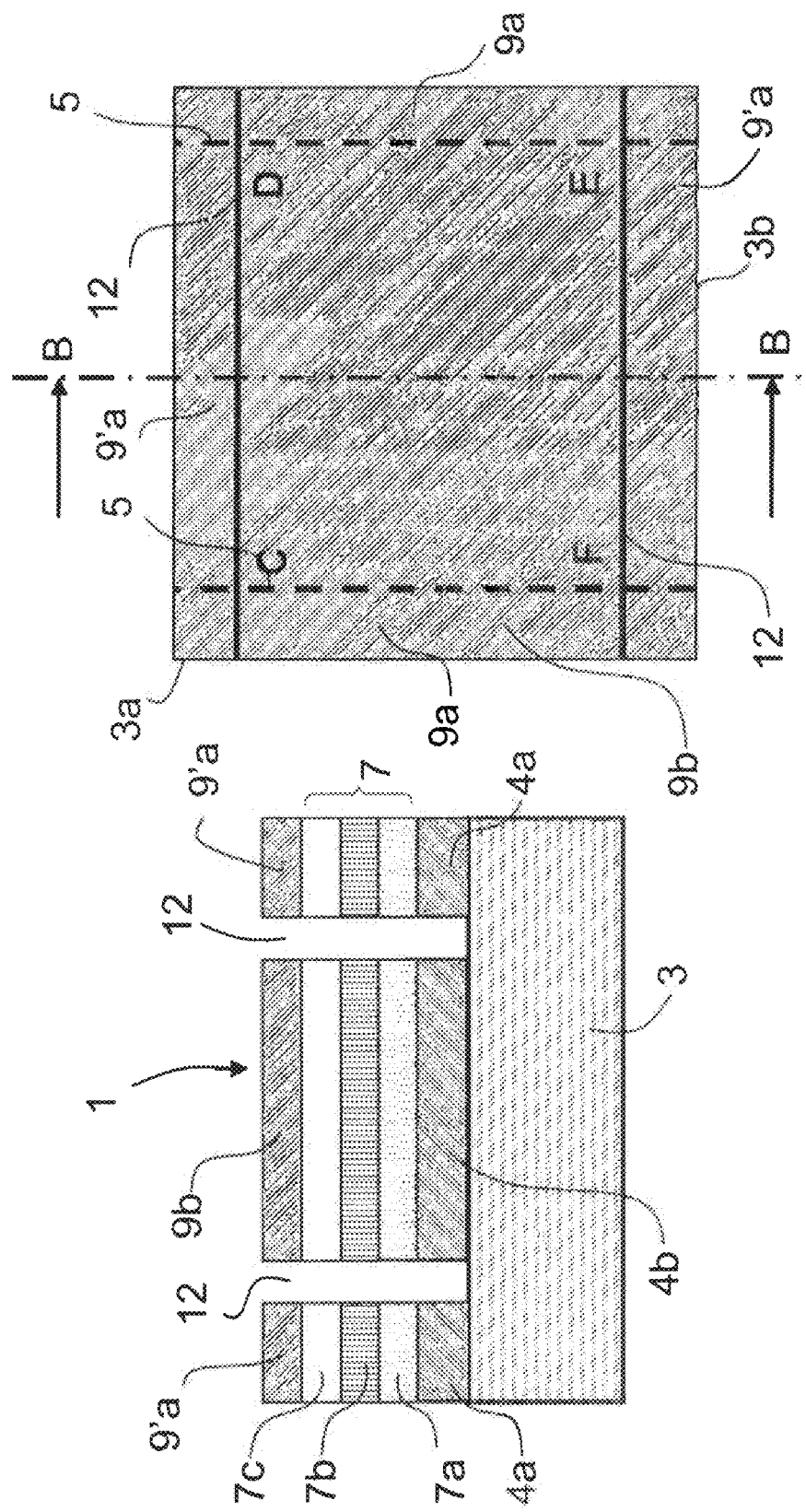
FIGS. 3a and 3b show, respectively, a schematic vertical sectional view along the line BB of FIG. 3b and a schematic top view illustrating another production phase of a total partition according to the invention.

Next, as shown in FIGS. 3a and 3b, two other partitions 12 are produced as borders of the two other opposed sides 3b of the substrate 3, these other partitions being shown as continuous lines in the figures. These two partitions are total type partitions that extend through the upper electrode 9 and right through the layers which separate it from the substrate 3, namely, in the present example, the three functional electrochromic layers 7a, 7b and 7c and the lower electrode 4. Each of these two partitions 12 thus divide the surface of the upper electrode 9 into two regions, namely a second free region 9'a and an active region 9b containing the active area CDEF of the device.

Each of the two partitions 12 also divides the other layers and, in particular, the lower electrode 4 into two regions, namely a first region 4a, denoted "free" and a second region 4b denoted "active". In the present mode of implementation, the active region is common to both partitions and it contains the active area CDEF of the device as explained below.

In the process according to the invention it is of course possible to reverse the order in which the selective partition 5 and the total partition 12 are produced.

It is noted that each of the free regions 9a defined by each selective partition 5 and each of the free regions 4a, 9'a defined by each total partition 12 is electrically isolated, on the one hand, from the other free regions and, on the other hand, from the respective active regions 4b and 9b or the lower and upper electrodes containing the active area CDEF of the device. Each of the free regions of an electrode may therefore be connected to an active region of the other electrode without causing a short-circuit.

Figures 4A, 4B:
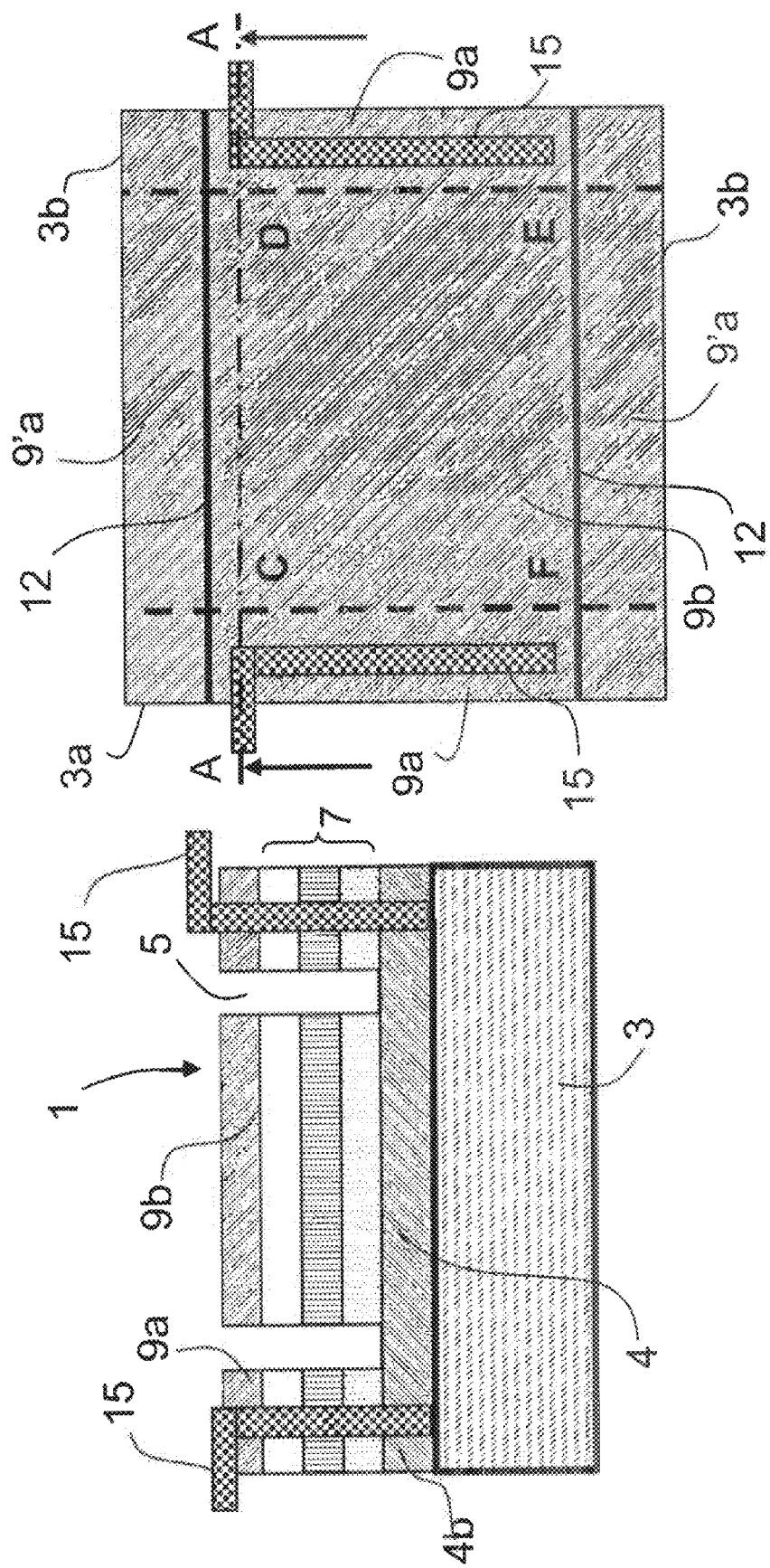
FIGS. 4a and 4b show, respectively, a schematic vertical sectional view along the line AA of FIG. 4b and a schematic top view illustrating a phase of soldering a connection element to the lower electrode of the device according to the invention shown in the preceding figures.

The invention therefore makes it possible, in a third step, as shown in FIGS. 4a and 4b, to solder ultrasonically a connection lead 15 to the lower electrode 4 from the free region 9a of the upper electrode 9 without this operation causing a short-circuit.

Figure 5C:
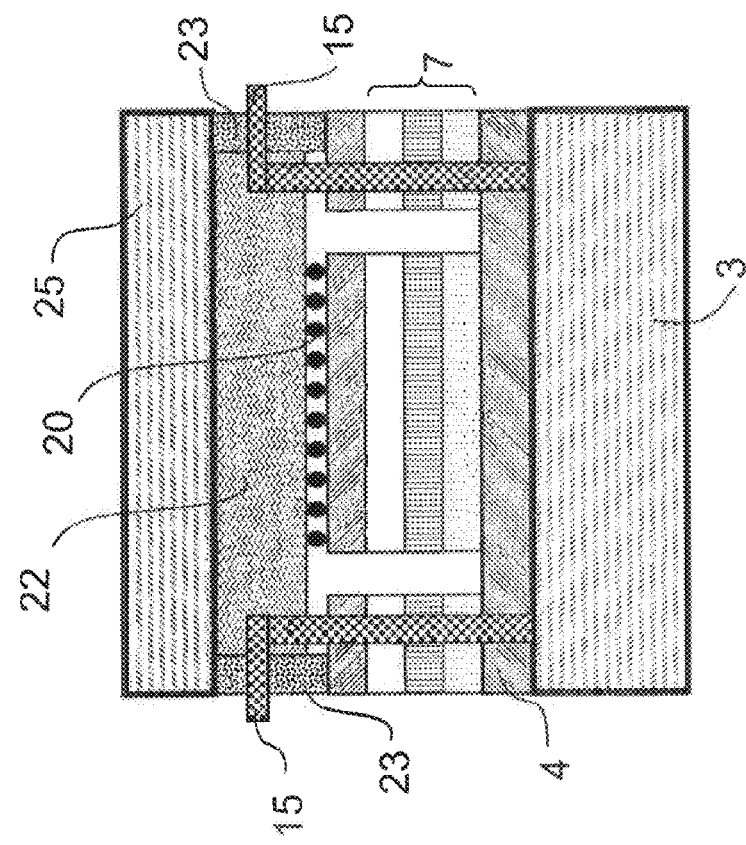
FIG. 5c is a schematic vertical sectional view along the line BB of FIG. 5b illustrating the final production phase of the device according to the invention shown in the preceding figures.

The electrical connection to the upper electrode 9 will be obtained by connection means consisting of an array of electrically conducting elements, especially an array of conducting wires 20, as shown in FIGS. 5a to 5c.

This array consists of parallel wires which are separated by a distance of around 1 to 3 mm and which are soldered to the connection leads 21. The array of wires 20 is placed onto a thermoplastic polymer-based interlayer support sheet 22, in particular a sheet of polyurethane or polyvinyl butyral (PVB), which ensures the array is kept in place as shown in FIG. 5c.

The dimensions of the interlayer support sheet 22 will preferably be slightly smaller than those of the other layers of the multilayer stack so as to allow the application, on the periphery, of a seal 23 through which the connection leads 15 and 21 pass and which thus contributes to keeping the leads in place.

The multilayer stack is finished with a glass back substrate 25 and the assembly is then laminated. During this operation, as shown in FIG. 5c, the interlayer support sheet 22 applies the array of wires 20 against the upper electrode 9 thus ensuring an excellent electrical contact between the wires 20 and the upper electrode.

Such an implementation allows a low upper electrode resistivity of around $0.5\Omega/\square$ to be obtained, thereby reducing the switching time of the system as well as the halo phenomenon that has a tendency to manifest itself with this type of device.

This is because, as is known, when a variation in transmission of the active surface is required, for example a transparency variation, this variation is not an immediate uniform-density variation over the whole of this active surface. For problems particularly associated with the resistivity of the various electrochromic layers in question, as well as with a resistivity difference between the upper and lower electrodes, the geometrical variation in time of the transparency of the active surface, denoted "occultation profile" hereinafter, may take various aspects depending on the arrangement of the connection leads 15 and 21 on the electrodes.

The present invention enables the device designer to produce electrochromic devices with a great deal of ease, the connection leads of which may be shaped and arranged on the electrodes depending on the desired occultation profile.

Figure 6:
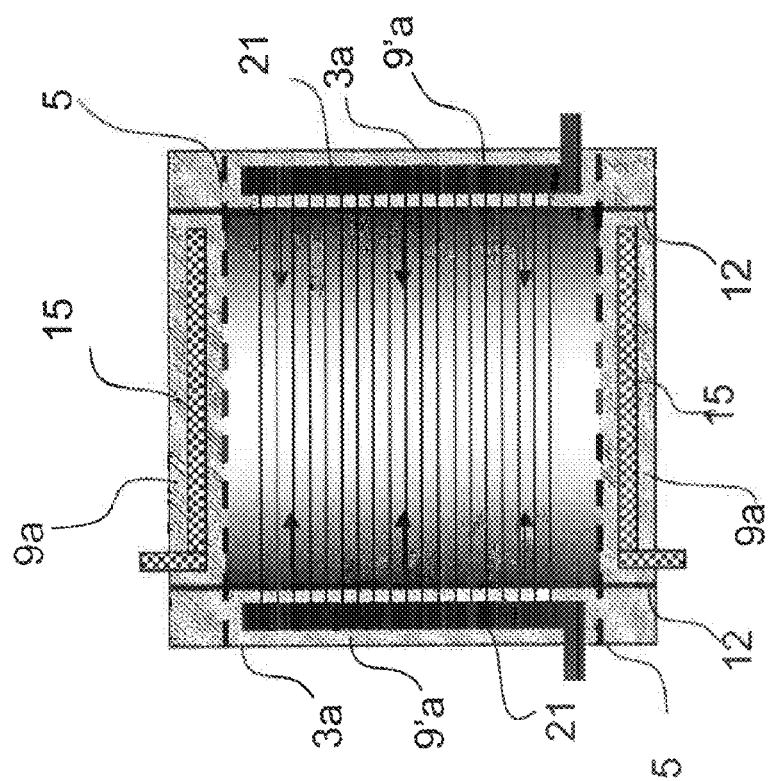
FIG. 6 shows a schematic top view of an exemplary occultation profile obtained with the previously shown device according to the invention.

Thus, with the arrangement previously described, an occultation profile having the form of a curtain that moves from the edges 3a toward the center, shown schematically in FIG. 6, is obtained.

Moreover, in this mode of implementation of the invention the active area CDEF of the device is bounded by the selective partitions 5 (dotted lines in the figures) and the total partitions 12 (continuous lines in the figures). The present invention makes it possible to minimize the area of the free regions in line with which the connections are made, thus increasing the active area of the device compared with the solutions of the prior art.

Figures 7A, 7B:
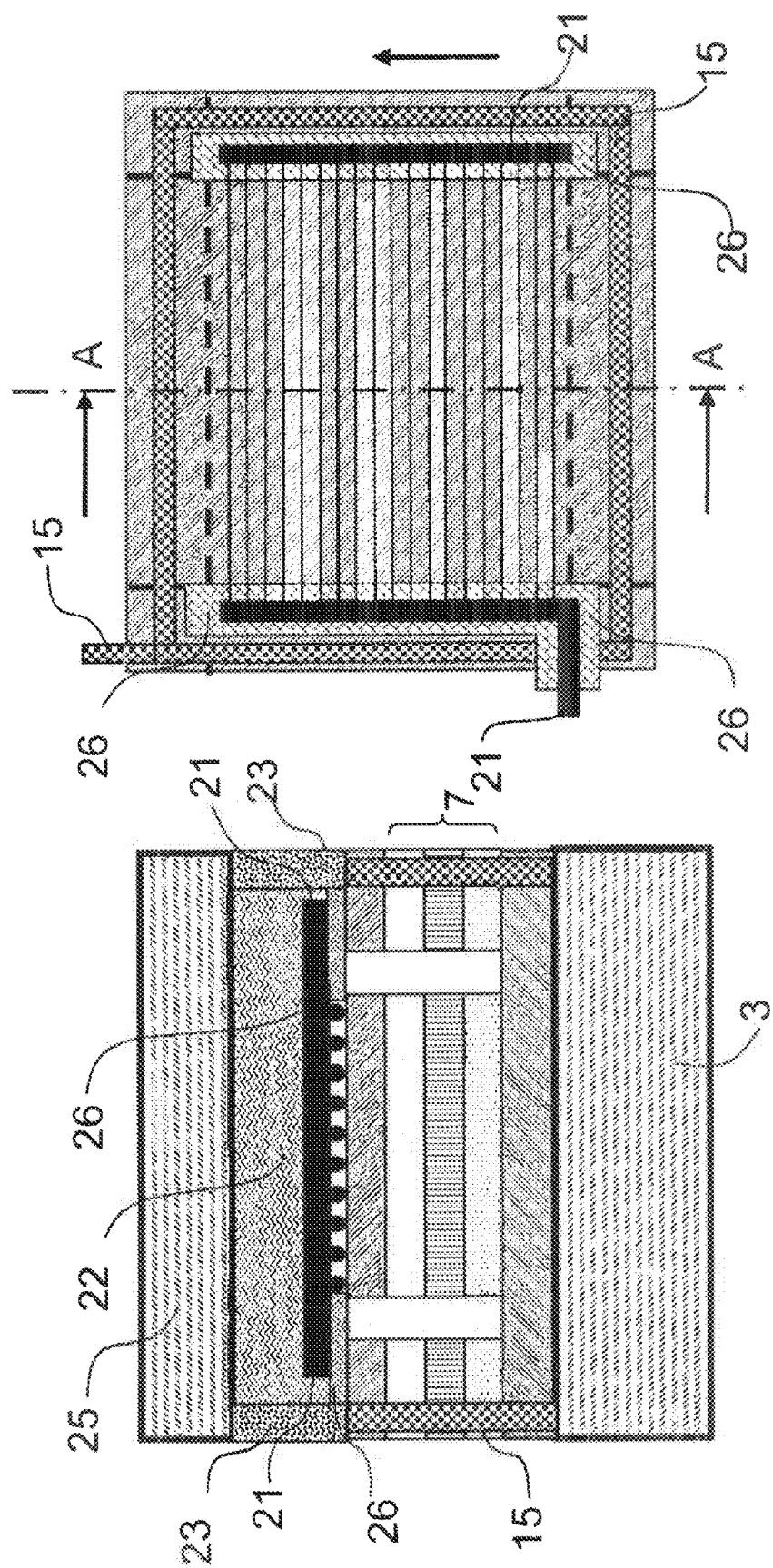
FIGS. 7a and 7b show, respectively, a schematic vertical sectional view along the line AA of FIG. 7b and another exemplary implementation of the present invention.

It is also possible, in an embodiment variant shown in FIGS. 7a and 7b, to form a connection lead which is placed onto the entire periphery of the upper electrode 9 and more precisely onto the free regions 9a and 9'a of the latter, this connection lead being soldered ultrasonically to the lower electrode 4.

In such a configuration, so as to avoid short-circuits, transparent insulating bands 26 are interposed between the regions 9a and 9'a of the upper electrode 4 and the connection leads 21 between which leads the wires 20 are placed.

In another implementation variant of the invention, shown in FIG. 8, the connection to the upper electrode 9 is made with frame-shaped metal foils 21a which are placed onto the periphery of the active region 9b and soldered to a connection lead 21b. These foils 21a are applied, during the lamination operation, against the active region 9b by the interlayer sheet 22 thus establishing a good electrical contact with the active region.

The present invention thus allows the critical step of placement and removal of the masking adhesives to be eliminated from the electrochromic device fabrication process, which leads to a very significant time saving, while, at the same time, the reliability of these devices over time is improved because their lower electrode (4) is soldered to the connection means. By significantly reducing the leakage currents the invention also allows an electrochromic device that has a reduced response time and that consumes less electricity to be produced. The invention finally allows the active area CDEF to be maximized with respect to the size of the support substrate and allows the shape of the device's occultation profile to be controlled.

Figure 9:
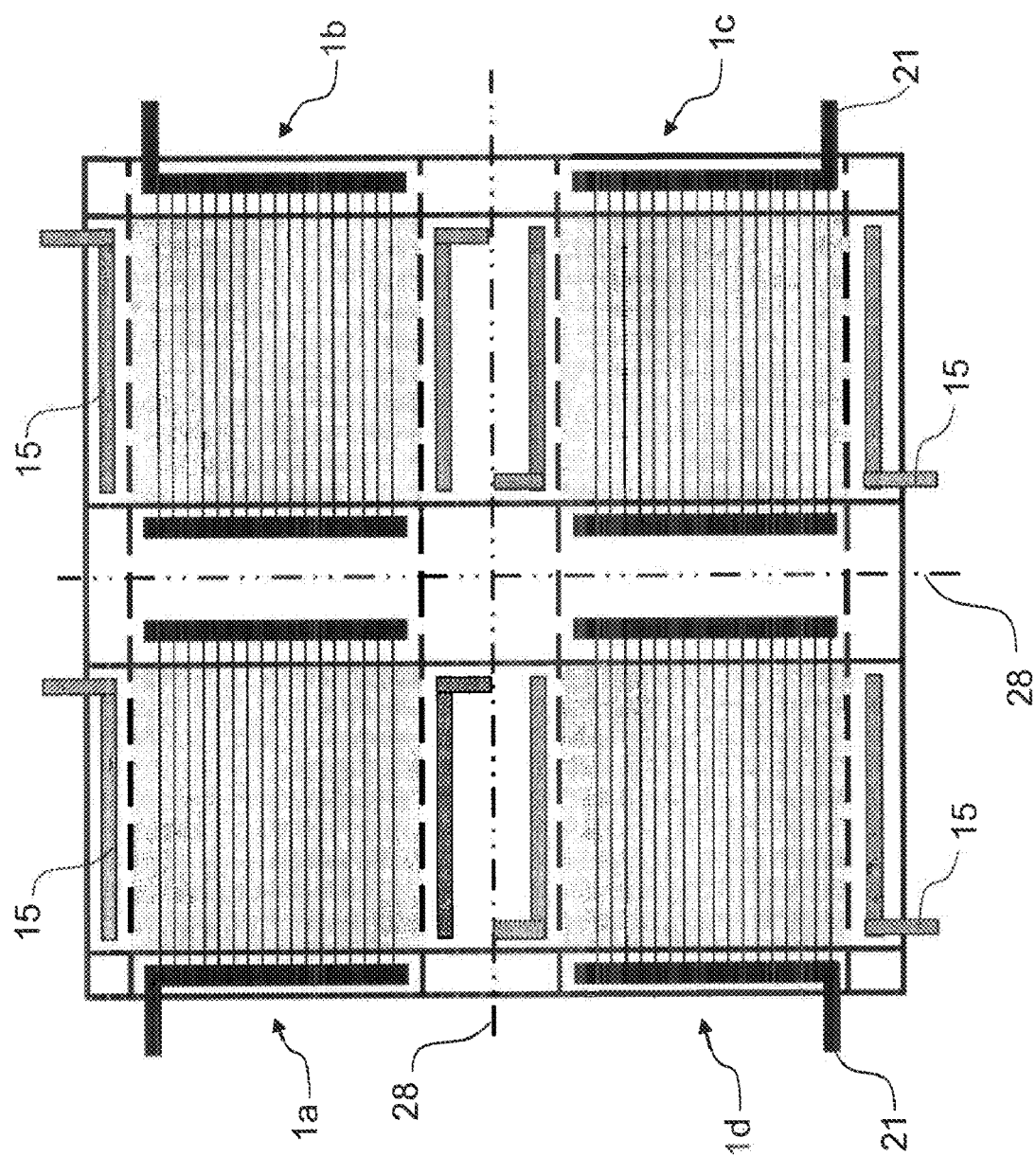
FIG. 9 is a schematic top view of another variant showing the production of several devices according to the invention from one and the same substrate.

Equally, according to the invention, several electrochromic devices 1 may be produced on one and the same support substrate 3. At the end of the fabrication process these devices will be separated by cutting the substrate along the lines 28 shown as dot-dash lines in FIG. 9, so as to constitute specific electrochromic devices 1a, 1b, 1c and 1d.

Such a mode of implementation allow the production, for example, of only four total partitions and four selective partitions for four devices, which represents a simplification of and a time saving during fabrication.

The invention claimed is:

1. An electrochromic device having controlled transmission or reflection of at least one electrically controllable active area (CDEF), comprising, on a carrier substrate, a multilayer stack comprising at least, in succession:
   a layer forming a lower electrically conductive electrode;
   various functional layers, at least one of which is an electrochromic layer; and
   a layer forming an upper electrically conductive electrode,
   in which device:
      at least one selective partition passes through the upper electrode and the various layers separating the upper electrode from the lower electrode without passing through the lower electrode, the at least one selective partition dividing at least one surface of the upper electrode into two regions electrically isolated from each other, namely a free region and an active region containing the active area (CDEF);
      at least one total partition passes through the upper electrode and the various layers separating the upper electrode from the substrate, the at least one total partition dividing at least one surface of the lower electrode into two regions electrically isolated from each other, namely a free region and an active region containing the active area (CDEF);
      at least one free region of the upper electrode receives a first current-supply connector soldered to the active region of the lower electrode; and
      the active region of the upper electrode is in electrical contact with a connection unit connected to a second current-supply connector, which is electrically isolated from the free region connected to the lower electrode.

2. The device as claimed in claim 1, wherein the total partition divides the surface of the upper electrode into two regions, namely a second free region and an active region containing the active area (CDEF), the second current-supply connector being placed into the second free region of the upper electrode.

3. The device as claimed in claim 1, wherein the connection unit comprises an array of fine electrically conducting parallel wires.

4. The device as claimed in claim 1, wherein transparent insulating bands are placed between the free regions of the upper electrode and the second current-supply connectors between which connectors the wires are placed.

5. The device as claimed in claim 1, wherein the connection unit comprises a metal frame, placed on the periphery of the active region.

6. The device as claimed in claim 1, wherein the connection unit is supported by a transparent support.

7. The device as claimed in claim 6, wherein the support comprises a lamination interlayer.

8. The electrochromic device as claimed in claim 1, wherein the current-supply connector soldered to the lower electrode is placed onto several free regions of the upper electrode, and an electrical isolation element is provided between said second current-supply connector and the surface of the upper electrode.

9. The electrochromic device as claimed in claim 8, wherein the isolation element is a thin electrically insulating sheet.

10. The device as claimed in claim 1, wherein the carrier substrate comprises a glazing and, optionally, is made of glass or plastic.

11. The device as claimed in claim 1, wherein the solder joint between the current-supply connector and the lower electrode is ultrasonically soldered.

12. The device as claimed in claim 11, wherein the current-supply connector is placed onto the entire periphery of the upper electrode.

13. The device as claimed in claim 1, wherein at least one of the electrodes comprises at least one indium tin oxide (ITO) layer.

14. The device as claimed in claim 1, wherein the free regions, defined by the total partitions and the selective partitions, are located on the periphery of said device.

15. The device as claimed in claim 14, wherein the substrate is rectangular shaped and in that the selective partitions and the total partitions are respectively produced so as to be parallel with opposed sides of the substrate.

16. The device as claimed in claim 1, wherein the total partitions and the selective partitions are respectively perpendicular.

17. An electrochromic glazing, comprising the device as claimed in claim 1.

18. An architectural, automotive, mirror, display, signage, or camera shutter glazing comprising the glazing as claimed in claim 17.

19. A process for fabricating an electrochromic device having controlled transmission or reflection of at least one electrically controllable active area, comprising, on a carrier substrate, a multilayer stack comprising at least, in succession;

an electrically conductive layer forming a lower electrode;
various functional layers at least one of which is an electrochromic layer; and
an electrically conductive layer forming an upper electrode, the process comprising:
(A) depositing in succession, onto at least part of the surface of the substrate, the electrically conductive layer forming the lower electrode, the various functional layers and the electrically conductive layer forming the upper electrode;
(B) producing, starting from the upper electrode, at least one selective partition that passes through the upper electrode as well as the other layers separating the upper electrode from the lower electrode without passing through the latter, each selective partition dividing at least the surface of the upper electrode into two regions electrically isolated from each other, namely a free region and an active region containing the active area (CDEF);
(C) producing, starting from the upper electrode, at least one total partition that passes through the upper electrode as well as the layers which separate the upper electrode from the substrate, each total partition dividing at least the surface of the lower electrode into two regions electrically isolated from one another, namely a free region and an active region;
(D) soldering a current-supply connector to the free region of the upper electrode and to the active region of the lower electrode located in line with the latter; and
(E) placing at least one connection unit, which is electrically connected to a current-supply connector, in electrical contact with the active region of the upper electrode.

20. The process as claimed in claim 19, wherein said solder joint is ultrasonically soldered.

21. The process as claimed in claim 19, wherein at least one of the total and selective partitions is produced by a laser beam.

22. The process as claimed in claim 19, further comprising producing several electrochromic devices having controlled transmission or reflection of at least one electrically controllable active area (CDEF), comprising, on a carrier substrate, a multilayer stack comprising at least, in succession:

a layer forming a lower electrically conductive electrode;
various functional layers, at least one of which is an electrochromic layer; and
a layer forming an upper electrically conductive electrode, in which device:
at least one selective partition passes through the upper electrode and the various layers separating the upper electrode from the lower electrode without passing through the lower electrode, the at least one selective partition dividing at least the surface of the upper electrode into two regions electrically isolated from each other, namely a free region and an active region containing the active area (CDEF);
at least one total partition passes through the upper electrode and the various layers separating the upper electrode from the substrate, the at least one total partition dividing at least the surface of the lower electrode into two regions electrically isolated from each other, namely a free region and an active region containing the active area (CDEF);
at least one free region of the upper electrode receives a first current-supply connector soldered to the active region of the lower electrode; and
the active region of the upper electrode is in electrical contact with a connection unit connected to a second current-supply connector, which is electrically isolated from the free region connected to the lower electrode,
on the same carrier substrate, and, once said devices are completed, cutting the carrier substrate and all the layers deposited thereon so as to constitute specific devices.

* * * * *

UNITED STATES PATENT AND TRADEMARK OFFICE
CERTIFICATE OF CORRECTION

PATENT NO. : 8,289,609 B2
APPLICATION NO. : 12/922351
DATED : October 16, 2012
INVENTOR(S) : Driss Lamine et al.

It is certified that error appears in the above-identified patent and that said Letters Patent is hereby corrected as shown below:

Column 9, Line 57, "various functional layers at least one of whice is an" should read
-- various functional layers, at least one of which is an --

Signed and Sealed this
Nineteenth Day of March, 2013

Teresa Stanek Rea
*Acting Director of the United States Patent and Trademark Office*